US006985897B1

(12) United States Patent  
Abrahams

(10) Patent No.: US 6,985,897 B1  
(45) Date of Patent: Jan. 10, 2006

(54) METHOD AND SYSTEM FOR ANIMATED AND PERSONALIZED ON-LINE PRODUCT PRESENTATION

(75) Inventor: Marc David Abrahams, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 985 days.

(21) Appl. No.: 09/618,321

(22) Filed: Jul. 18, 2000

(51) Int. Cl.
 *G06F 17/30* (2006.01)

(52) U.S. Cl. .................... 707/4; 707/3; 707/104.1; 705/26; 705/27; 715/513; 715/716; 715/727; 709/217; 235/375

(58) Field of Classification Search .............. 707/3, 707/4, 10, 513, 104.1; 705/14, 26, 27, 37, 705/28; 715/716, 727; 709/217; 235/375
See application file for complete search history.

(56) References Cited

U.S. PATENT DOCUMENTS

| | | | |
|---|---|---|---|
| 4,028,733 A | 6/1977 | Ulicki | 360/10 |
| 4,992,940 A * | 2/1991 | Dworkin | 235/383 |
| 5,237,157 A | 8/1993 | Kaplan | 235/375 |
| 5,267,171 A * | 11/1993 | Suzuki et al. | 700/234 |
| 5,576,951 A * | 11/1996 | Lockwood | 235/381 |
| 5,736,977 A * | 4/1998 | Hughes | 345/716 |
| 5,752,239 A | 5/1998 | Coutts | 705/26 |
| 5,754,850 A * | 5/1998 | Janssen | 707/104.1 |
| 5,794,216 A * | 8/1998 | Brown | 705/27 |
| 5,801,694 A | 9/1998 | Gershen | 345/339 |
| 5,845,263 A | 12/1998 | Camaisa et al. | 705/27 |
| 5,848,399 A | 12/1998 | Burke | 705/27 |
| 5,884,282 A | 3/1999 | Robinson | 705/27 |
| 5,931,906 A | 8/1999 | Fidelibus, Jr. et al. | 709/217 |
| 5,956,709 A | 9/1999 | Xue | 707/3 |
| 5,963,916 A | 10/1999 | Kaplan | 705/26 |

OTHER PUBLICATIONS

CDNow, Inc.; "CDNow: Your Music. Your Store."; Internet address: http://www.cdnow.com/cgi-bin/mserver/redirect/leaf=; Copyright date 1994-1999; pp. 1-2.

CDNow, Inc.; "CDNow: Items"; Internet address: http://www.csnow.com/cgi-bin/mser . . . /CDN/FIND/album.html/itemid=791191; Copyright date 1994-1999, pp. 1-2.

\* cited by examiner

*Primary Examiner*—Shahid Alam
(74) *Attorney, Agent, or Firm*—Thomas F. Lebens; Fitch, Even, Tabin & Flannery

(57) ABSTRACT

A virtual personalized animated product selection and customer information gathering method and system includes providing a product presentation to a user by retrieving personalization data for the user from a database, assembling display data that is configured to render a three-dimensional display area on a video display with the display area including images of one or more products that are selected based on the personalization data, sending the display data through a computer network for display on a client computer video display, receiving a communication from the client computer through the computer network with the communication resulting from interactions with the display area, and updating the personalization data for the particular user in the database based on the communication.

22 Claims, 7 Drawing Sheets

METHOD AND SYSTEM FOR ANIMATED AND PERSONALIZED ON-LINE PRODUCT PRESENTATION

BACKGROUND OF THE INVENTION

1. Field of the Invention

The present invention relates generally to electronic commerce, and more specifically to personalized on-line three-dimensional product presentations.

2. Discussion of the Related Art

The ultimate shopping experience is a personalized shopping experience. Personalized shopping occurs when somebody with knowledge of the shopper's tastes and preferences selects an assortment of products and presents them to the shopper to choose from. This type of personalized treatment has heretofore only been available to the extremely wealthy who can afford to hire a personal shopper (i.e., a human being) to arrange and organize such product presentations. Needless to say, people of ordinary means have long suffered the agony of having to sift through countless products on store shelves searching for products in which they are interested.

Meanwhile, the recent increase in the popularity of the Internet has created a huge on-line marketplace for goods and services. The present rate of growth of this so-called electronic commerce ("e-commerce") is astounding. E-commerce has given people the ability to shop on-line for goods and services in the comfort of their own homes or offices at any time, day or night.

Current on-line shopping systems and product presentations, however, suffer from the disadvantage that they are not personalized. Consumers are forced to download and sift through numerous web pages with rather long and mundane lists of products. Finding a wanted product can be difficult and time consuming, similar to searching through numerous products on store shelves. And while photographs of products are occasionally included on the web pages, such photographs generally do not give the consumer the ability to examine the product in detail from any selected angle.

Thus, there is a need for a method and/or system for on-line product presentations which overcomes these and other disadvantages.

SUMMARY OF THE INVENTION

The present invention advantageously addresses the needs above as well as other needs through the provision of a method of providing a product presentation to a user. The method includes the steps of: retrieving personalization data for a particular user from a database; assembling display data that is configured to render a three-dimensional display area on a video display, the display area including images of one or more products that are selected based on the personalization data; sending the display data through a computer network for display on a client computer video display; receiving a communication from the client computer through the computer network, the communication resulting from interactions with the display area; and updating the personalization data for the particular user in the database based on the communication.

The present invention also provides a system for providing a product presentation to a user. The system includes a database configured to store personalization data for a particular user. A communication device is configured to provide a connection to a computer network. A processing system is configured to retrieve the personalization data from the database, assemble display data that is configured to render a three-dimensional display area on a video display with the display area including images of one or more products that are selected based on the personalization data, send the display data through the computer network for display on a client computer video display, receive a communication from the client computer through the computer network with the communication resulting from interactions with the display area, and update the personalization data for the particular user in the database based on the communication.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects featured and advantages of the present invention will be more apparent from the following more particular description thereof presented in conjunction with the following drawings herein.

Corresponding reference characters indicate corresponding components throughout several views of the drawing.

DETAILED DESCRIPTION OF A PREFERRED EMBODIMENT

The following description is not to be taken in a limiting sense, but is made for the purpose of describing the general principles of the invention. The scope of the invention should be determined with reference to the claims.

Figure 1:
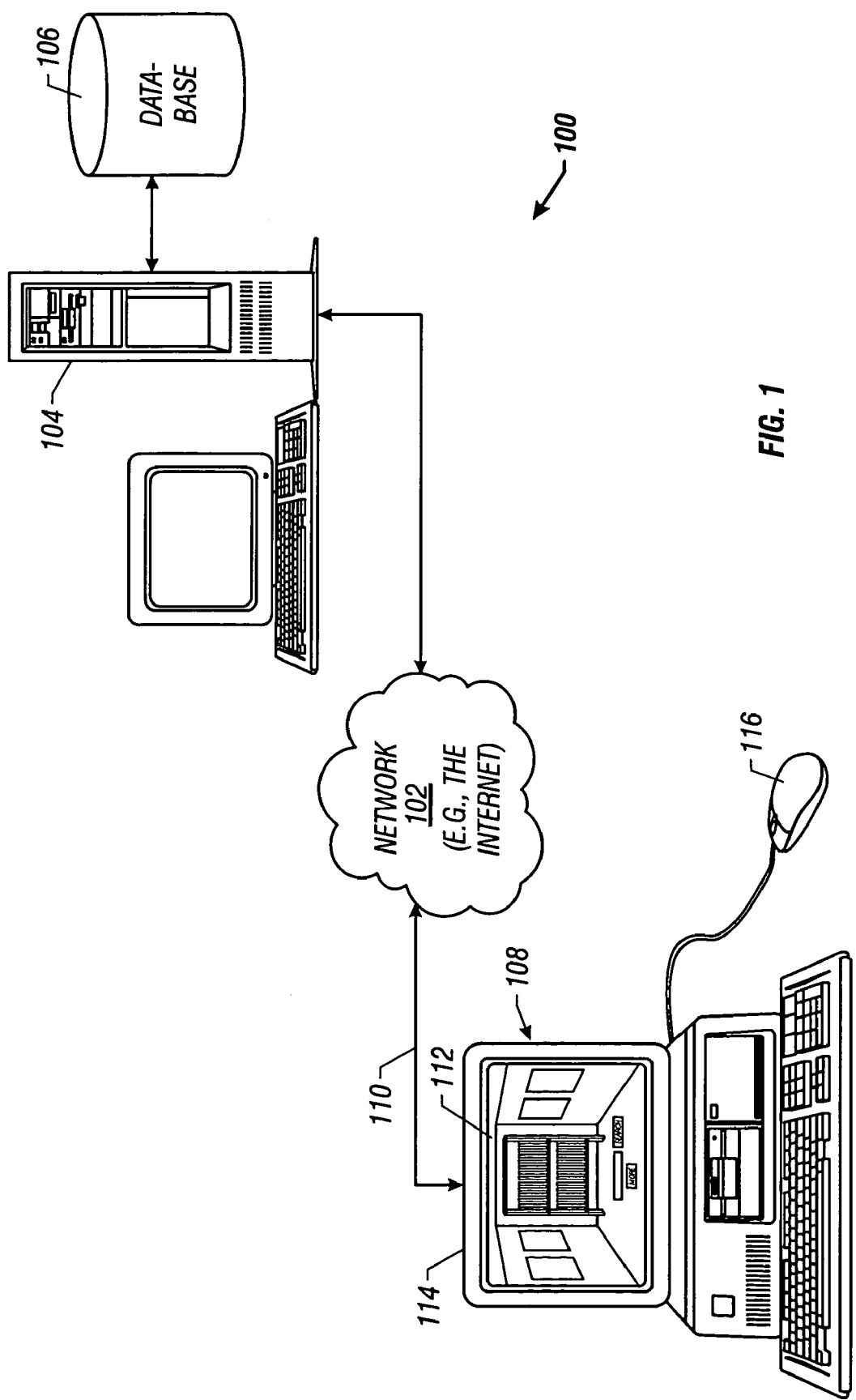
FIG. 1 is a schematic diagram illustrating a system that incorporates a method in accordance with one embodiment of the present invention.

Referring to FIG. 1, there is illustrated a system 100 that incorporates a method of on-line product presentation in accordance with an embodiment of the present invention. The on-line product presentations provided by the system 100 can be personalized, which overcomes the disadvantages of current on-line shopping systems. In other words, the system 100 is capable of learning the user's (i.e., the shopper or the customer) tastes and preferences and can select an assortment of products to present to the user on his or her computer screen. In a preferred embodiment, the present invention provides a virtual personalized animated product selection and customer information gathering tool.

The system 100 includes a computer network 102, which by way of example, may comprise the popular networks known as the Internet and/or the World Wide Web, or the network provided by America Online, Inc. of Dulles, Va. (AOL Network). A server 104 having a database 106 may be used to host an e-commerce web site in the network 102. The database 106 may be used to maintain a database of personalization data for users (discussed below).

Users may access the web site hosted by the server 104 by using any of several types of client computers. This way the web site will be displayed on the client computer's display screen. One type of client computer that may be used is the illustrated desktop personal computer (PC) 108. Other types of client computers that may be used in accordance with the present invention include notebook computers and hand-held devices. By way of example, such notebook computers may comprise any of Sony Corporation's popular VAIO™ line of computers, and such hand-held devices may include personal digital assistants (PDA), wireless telephones, and even virtual reality headsets and goggles. In the illustrated embodiment, the desktop PC 108 accesses the network 102 by means of a wired connection 110. It should be well understood, however, that in the present invention a client computer may access the network 102 by means of wireless communications.

The present invention simulates the experience of going into a real "brick and mortar" store. Specifically, a three-dimensional (3D) rendering of the inside of a store appears on the screen 112 of the client computer 108's video display 114. This virtual and animated room (or "display area") may include products on shelves and other images on the walls of the room. Preferably, the displayed products and images are chosen based on the user's personalization data. The user can interact with the virtual room using the computer 108's mouse 116 or other pointing device. This gives the user the ability to select certain products in the room in order to examine them in greater detail. By way of example, the present invention may be implemented by using the graphics and animation capabilities provided by Shockwave™ technology and an object oriented database.

Figure 2A:
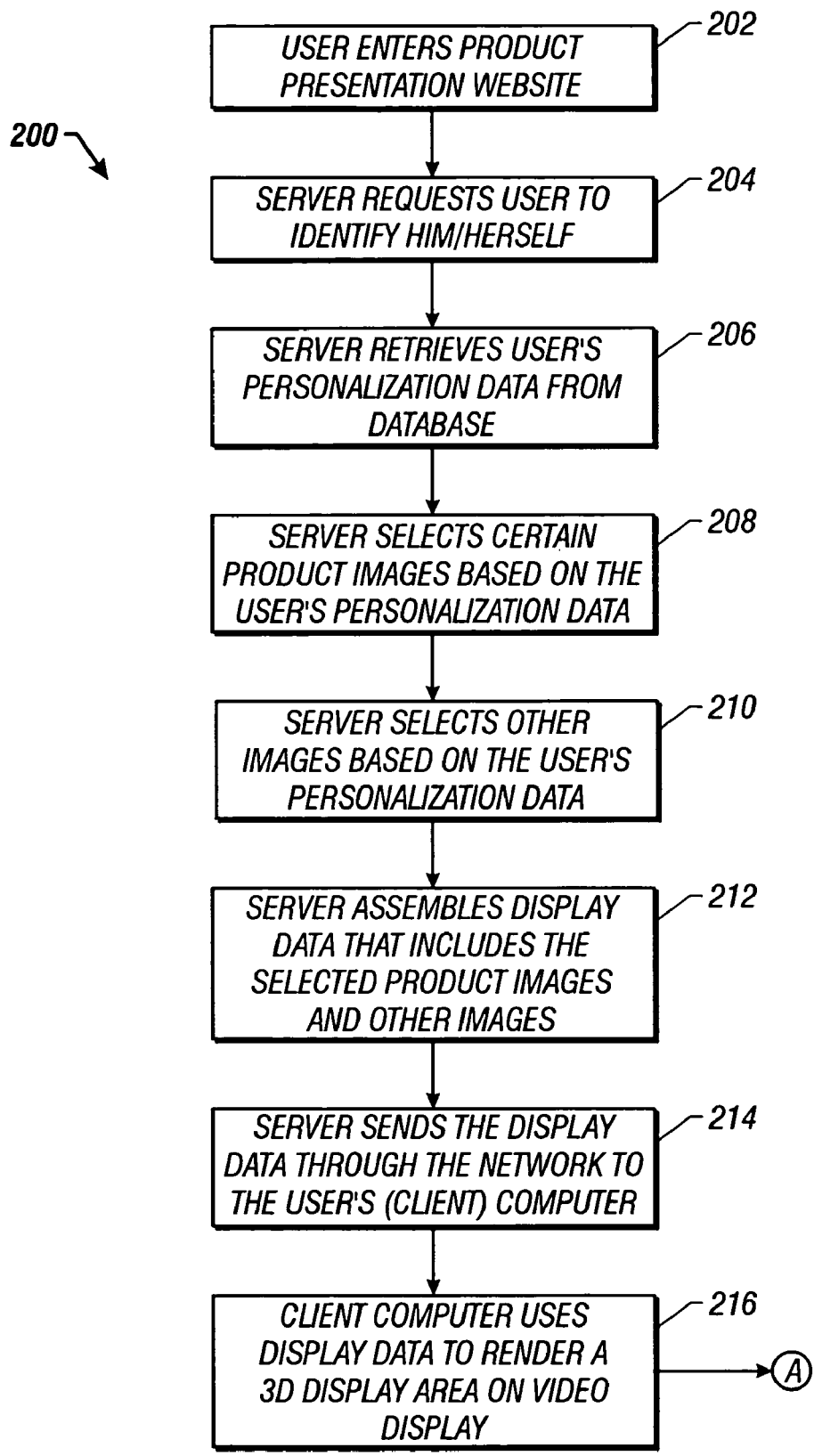
FIGS. 2A and 2B are flow diagrams illustrating a method of providing on-line product presentations in accordance with one embodiment of the present invention.
Figure 2B:
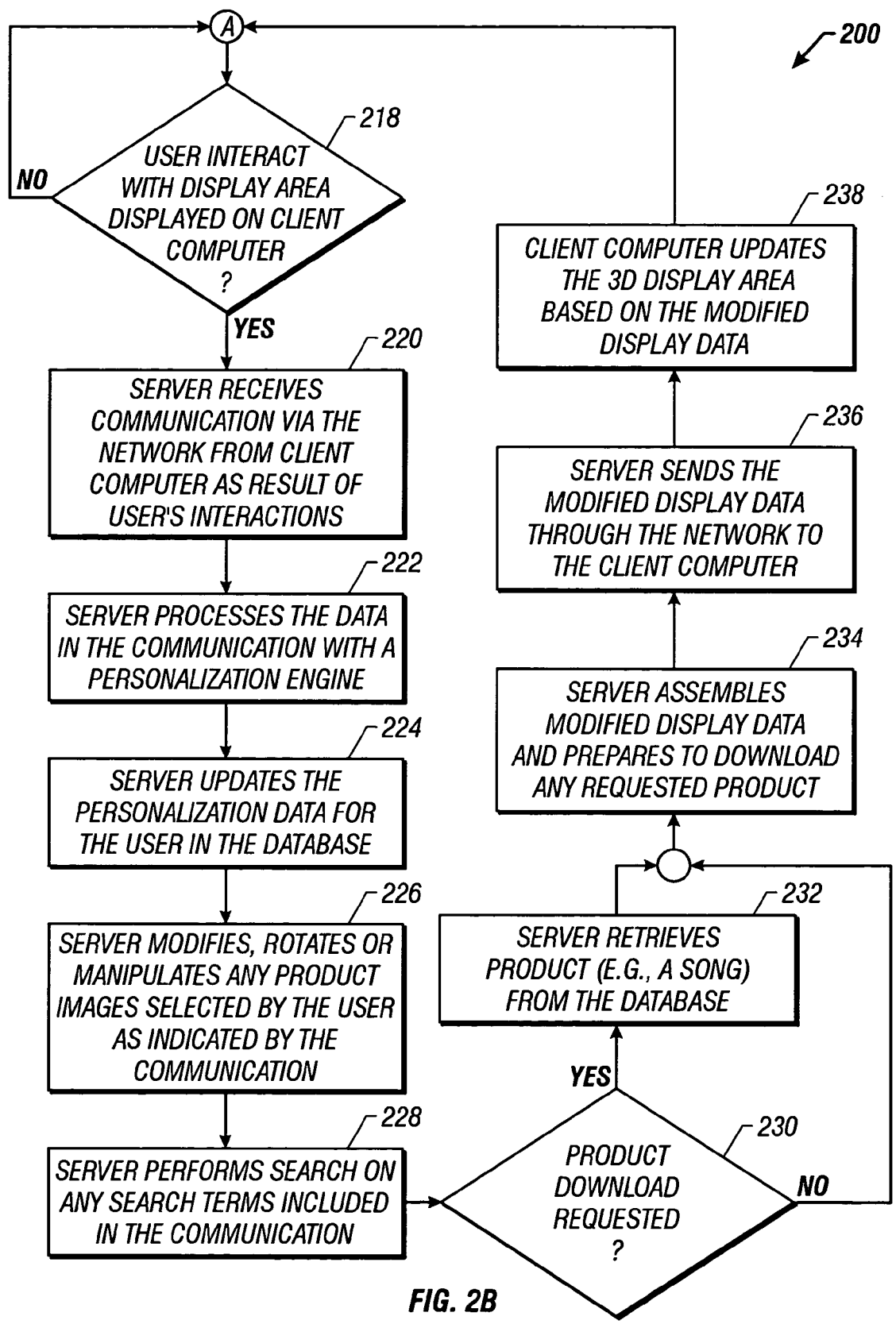

Referring to FIGS. 2A and 2B, there is illustrated an exemplary product presentation process 200 in accordance with an embodiment of the present invention. For the remainder of the discussion herein, it is assumed that the user enters data into a client computer, such the client PC 108, that communicates with a server, such as the server 104, through a computer network, such as the network 102 (which may comprise the Internet). Furthermore, the example implementation of the invention described herein will be of a music store in which compact discs (CDs) are the displayed products. It should be well understood, however, that the present invention can be applied to nearly any type of product and is not limited to CDs.

In step 202 the user operates the client computer 108 to enter the product presentation website hosted by the server 104. The server 104 requests the user to identify him or herself in step 204. In step 206 the server 104 retrieves the user's personalization data from the database 106.

At this point the user can choose to enter a virtual room containing CD's by either selecting a genre of music or by selecting "My Room". If the user selects a genre room, the environment of the room will match the genre. If the user selects "My Room", the environment reflects recommendations made by a personalization engine. Thus, the "My Room" selection provides a personalized room. It will be assumed herein that the user selects "My Room".

Using the personalization data, the server 104 selects certain product images in step 208. These images are preferably of products that suit the user's tastes and preferences.

In step 210 the server 104 selects other images based on the user's personalization data. These other images can include, for example, advertisements and announcements of new CDs and/or upcoming concerts which might be of interest to the user. In step 212 the server 104 assembles display data that includes the selected product images and other images. The server 104 sends this display data through the network 102 to the client computer 108 in step 214. In step 216 the client computer 108 uses the display data to render a three-dimensional display area on the screen 112 of the video display 114.

Figure 3:
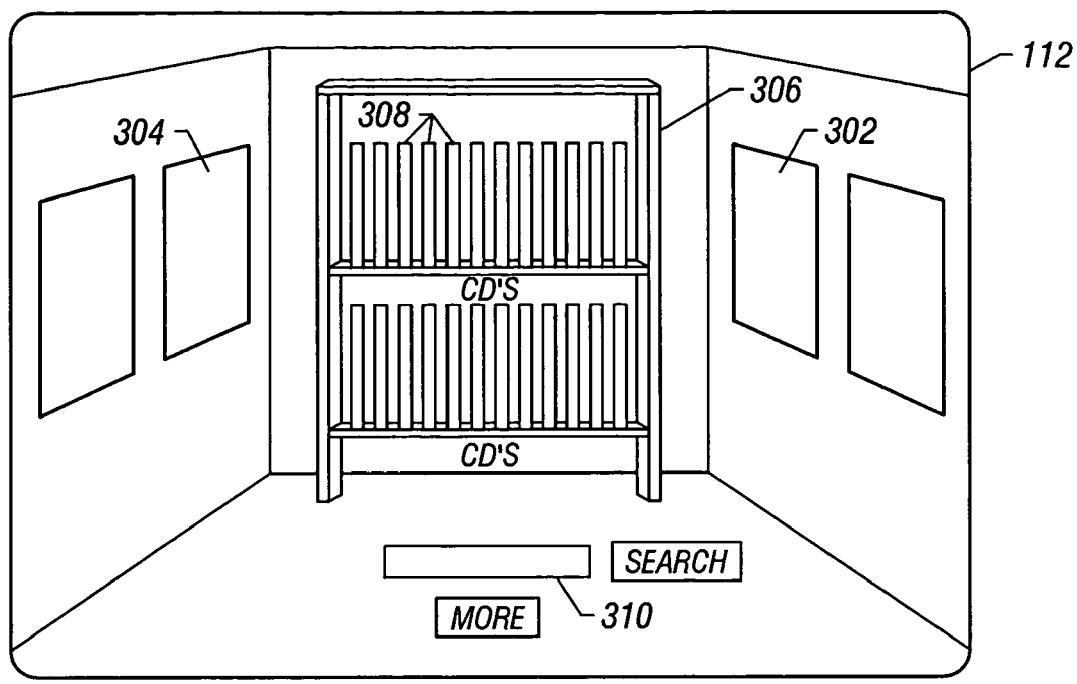
FIG. 3 is a screen shot illustrating in greater detail the three-dimensional display area on the screen of the client computer shown in FIG. 1.

FIG. 3 illustrates an exemplary 3D display area that may be produced on the screen 112 of the client computer 108. The display area comprises a virtual CD room that simulates the experience of going into a real music store. The virtual CD room contains images on the walls 302, 304 and a rack 306 with CD jewel cases 308 exposing the edge of the jewel case containing the title of the CD. The CD representations are preferably part of an object database that contains all the information about the CD. A personalization engine (discussed below) uses this object database to recommend which objects will be presented in the personalized room. The object database may be stored in the database 106.

Below the image of the CD rack 306 is an input box 310 for the search tool. In either "My Room" or the genre room, the user can move to the CD rack 306 to select any of the suggested CD's for review and purchase, or choose to search for a CD title, artist, track, etc., using the search input box 310. The user moves around the room using the mouse 116.

When the user first enters "My Room" a first set of CD recommendations will be automatically generated and displayed. The CD recommendations are generated by a personalization engine. If the user does not like any of the CDs in this first set, he or she can click on the "More" button to have a second set of CD recommendations automatically generated and displayed. The user can continue to click the "More" button to view additional CD recommendations. Inclusion of the "More" button is an optional feature of the present invention.

Referring to FIG. 2B, the client computer 108 waits for the user to interact with the display area displayed on the screen 112 in step 218. When the user interacts with the display area, the client computer 108 sends a communication through the network 102 to the server 104. In step 220 the server 104 receives this communication from the client computer 108. The server 104 processes the data in the communication with a personalization engine in step 222. After the data has been processed, the server 104 updates the personalization data for the user in step 224. The user's personalization data may be stored in the database 106.

Personalization engines and technology are currently available. For example, up-sell and cross-sell recommendations to users can be accomplished through the use of existing personalization tools like those currently available from Net Perceptions, Inc. of Eden Prairie, Minn. (www.netperceptions.com), Vignette Corporation of Austin, Tex. (www.vignette.com), and DataSage, Inc. (recently acquired by Vignette Corporation). These companies provide recommendation software, as well as e-marketing and personalization applications that help organizations create a comprehensive single enterprise-wide view of their customers. The products take historical purchase data, click stream data and user provided data and feed it through their engines. The engines use established modifiable rules and a product catalog to make the recommendations of other products that should be of interest to the user. Such personalization engines may be used to implement steps 222, 224.

The use of a personalization engine in the present invention provides for a dynamic virtual reality environment. Namely, as the personalization engine gathers more data on a customer's habits and traits, the engine will be able to better select and recommend specific products to the customer. The displayed products will change as the system becomes more familiar with the customer. Thus, the displayed items are dynamic based on knowledge of the customer.

By using personalization tools and engines, a company can gather information about its customers' preferences, which helps the company attract and keep customers. Use of the present invention assists a company in gathering of customer product information, either products they own or products they are looking to buy. This information can later be used for marketing or for other up-sell and cross-sell applications.

As mentioned above, the user may click on one of the CD images to view the CD in more detail. If the user does request such a detailed view of one of the CDs, then that request is indicated by the communication sent from the client computer 108 to the server 104. In step 226 the server 104 performs the requested modification, rotation or manipulation of the selected product image. The modified image will be included in modified display data that will eventually be sent to the client computer 108.

If the user's interactions with the display area include the entry of one or more search terms in the search input box 310, then those search terms are included in the communication sent from the client computer 108 to the server 104. In step 228 the server 104 performs a search on those search terms (if any). Similar to the modified images, the results of the search will be included in modified display data that will eventually be sent to the client computer 108.

In addition to purchasing a complete CD to be delivered via mail or other delivery service, users preferably also have the ability to purchase one or more individual songs (titles) for immediate electronic distribution (download). This feature can also be used to download samples of songs. In step 230 the server checks the communication sent from the client computer 108 to the server 104 to see whether or not any song downloads were requested by the user. If so, the server 104 retrieves electronic versions of the requested song(s) from the database 106 in step 232.

In step 234 the server 104 assembles modified display data and prepares to download any requested songs. The modified display data includes any requested manipulated images or search results. The server 104 sends the modified display data through the network 102 to the client computer 108 in step 236. In step 238 the client computer 108 updates the 3D display area based on the modified display data. The server 104 then waits for the user to interact with the display area again.

Figure 4:
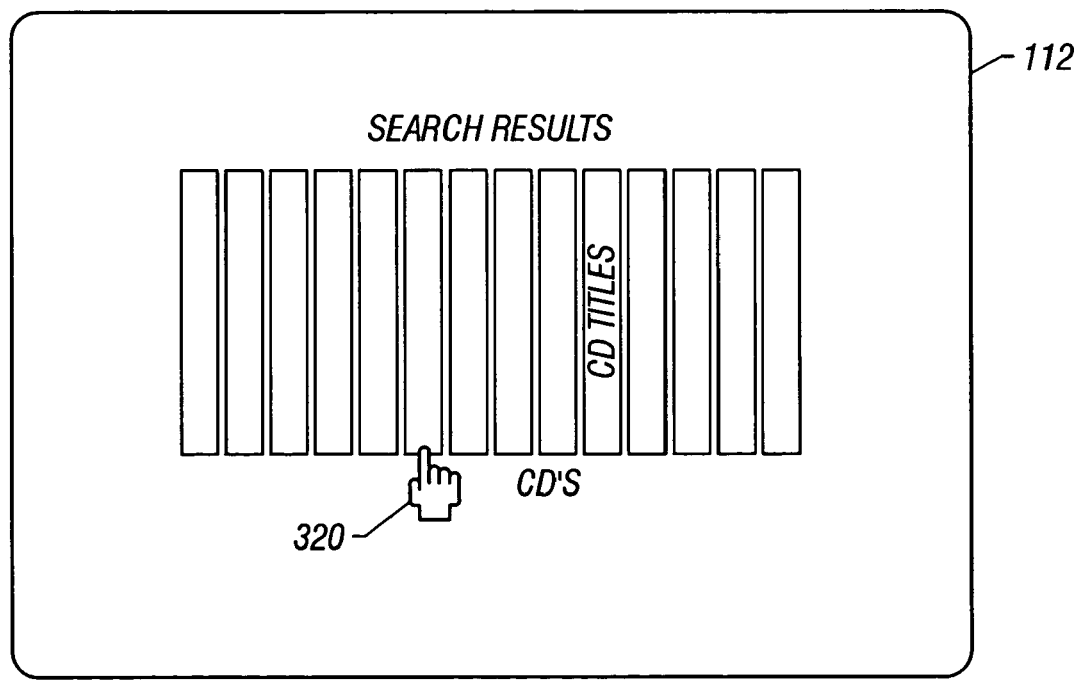
FIG. 4 is a screen shot illustrating the results of a search feature in accordance with one embodiment of the present invention.

An example will be used to illustrate some of the features of the above described process. Specifically, if the user enters search terms into the search input box 310, then the modified display data sent to the client computer 108 in step 236 could, for example, render the display depicted in FIG. 4 on the screen 112. In other words, several CDs that were found in a search using the search terms could be displayed. The jewel cases of the CDs could be displayed in a close-up view so that the titles can be easily read.

If the user wants to view one of the displayed CDs in more detail, he or she can click on the jewel case of the CD using the mouse 116 to control a cursor 320. It should be understood that the user can click on the jewel case of a CD at any time to view the CD in more detail. For example, whether the virtual CD rack 306 has been filled by selecting "My Room", selecting a genre room, or performing a search, the user can select a CD to view in more detail by clicking on one of the jewel cases in the CD rack 306. Thus, the virtual room is further dynamic in that the user can interact with the room to view products at different angles, open up the products, zoom in on the products, etc.

Figure 5:
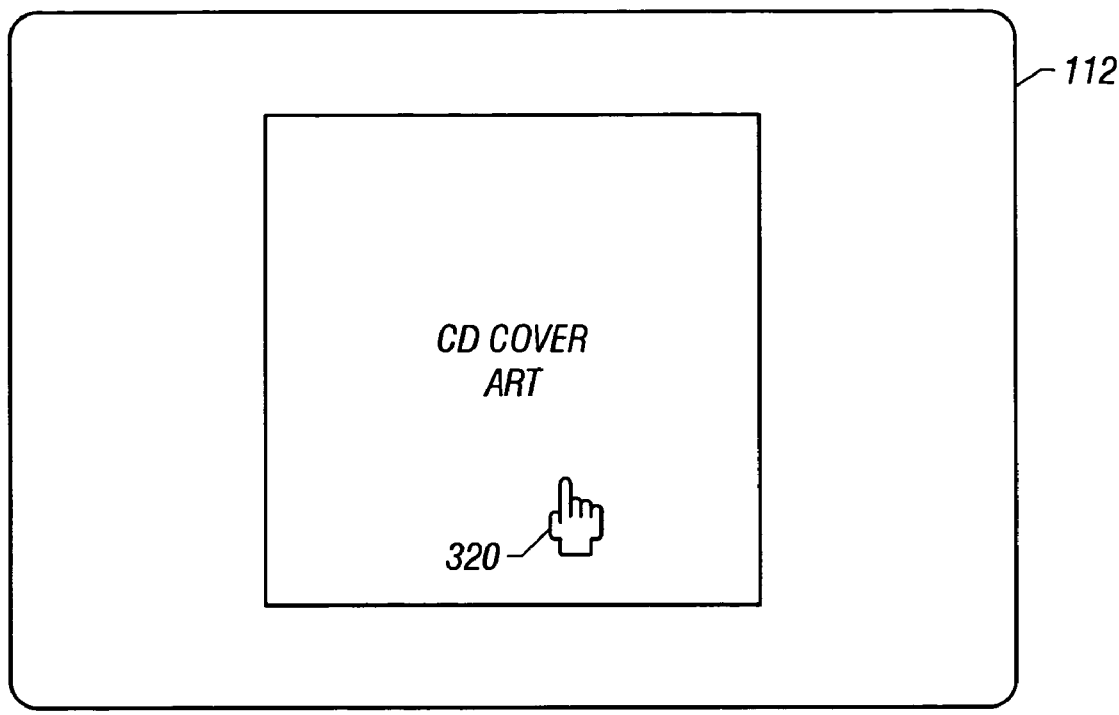
FIGS. 5, 6 and 7 are screen shots illustrating the on-screen manipulation of a product image in accordance with one embodiment of the present invention.
Figure 6:
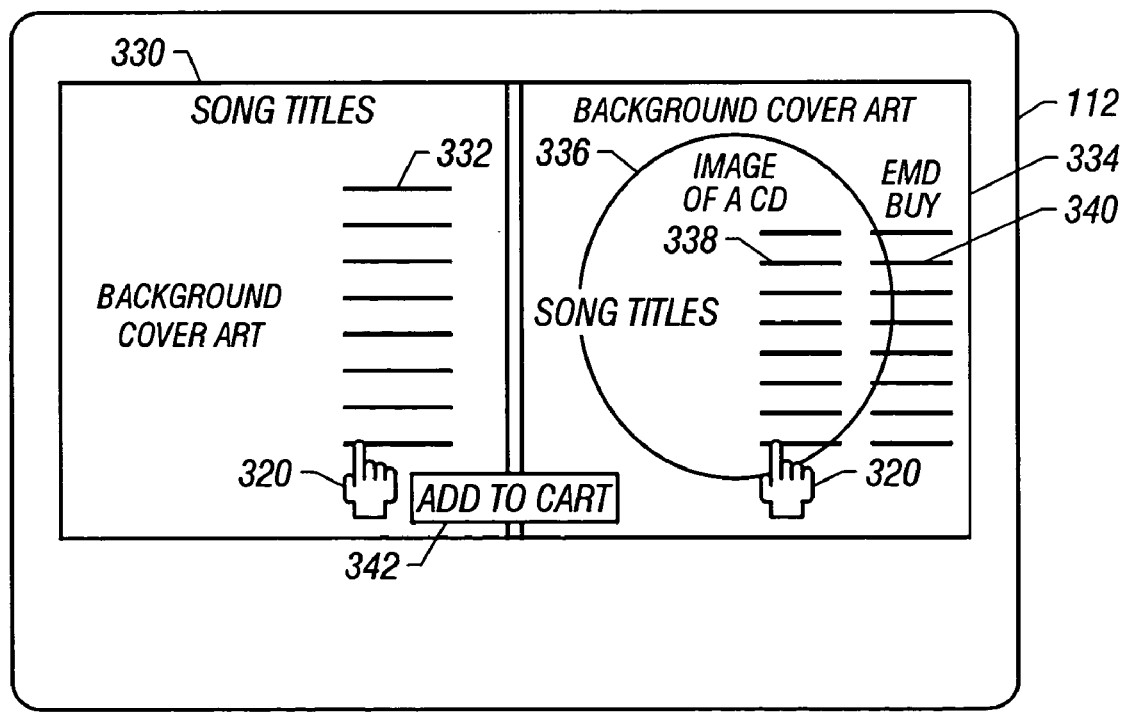

After the user clicks on a CD, the modified display data sent to the client computer 108 in step 236 could, for example, render the display depicted in FIG. 5 on the screen 112. Ideally, animation would show the selected CD sliding back out of the rack 306 and turning to display the cover art. The user could then either choose a different CD in the rack 306 or click on the chosen CD (with the cursor 320) to open the jewel case. If the later option is chosen, animation would preferably be used to show the jewel case opening to expose the left and right insides of the case, as illustrated in FIG. 6.

The same CD database that includes graphics and animation may also be used to show the details of the customers' chosen title. The customized room is preferably linked to a transaction engine providing the ability for the customer to purchase either the entire CD in hard copy or any individual track by electronic distribution.

Figure 7:
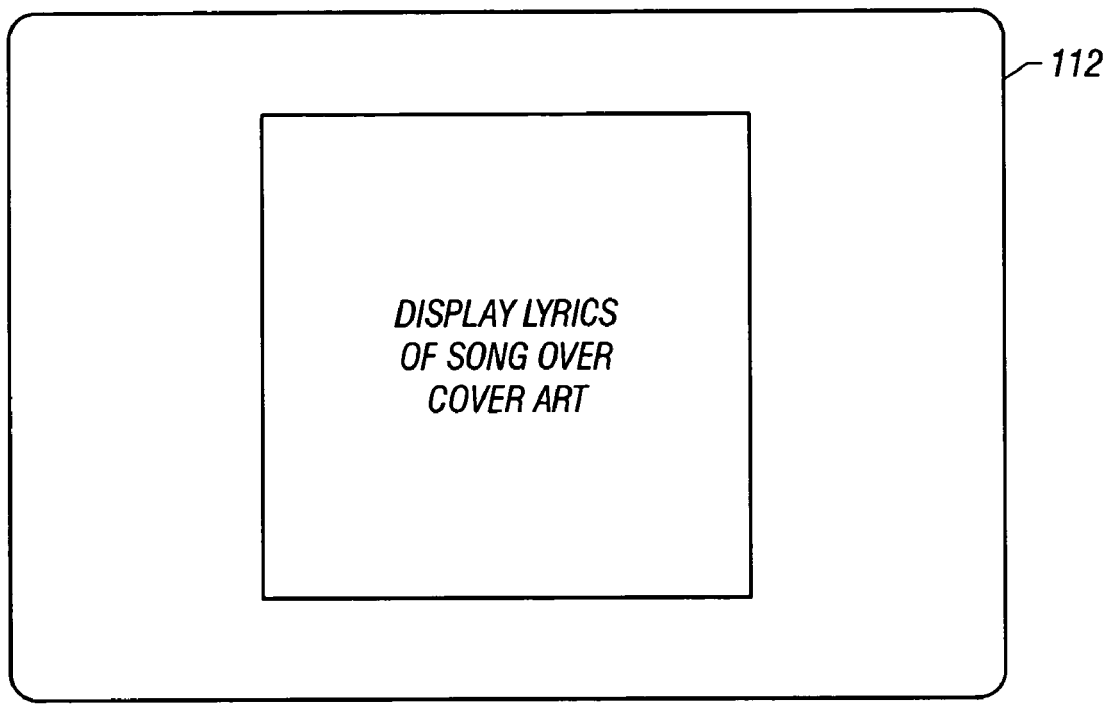
Figure 8:
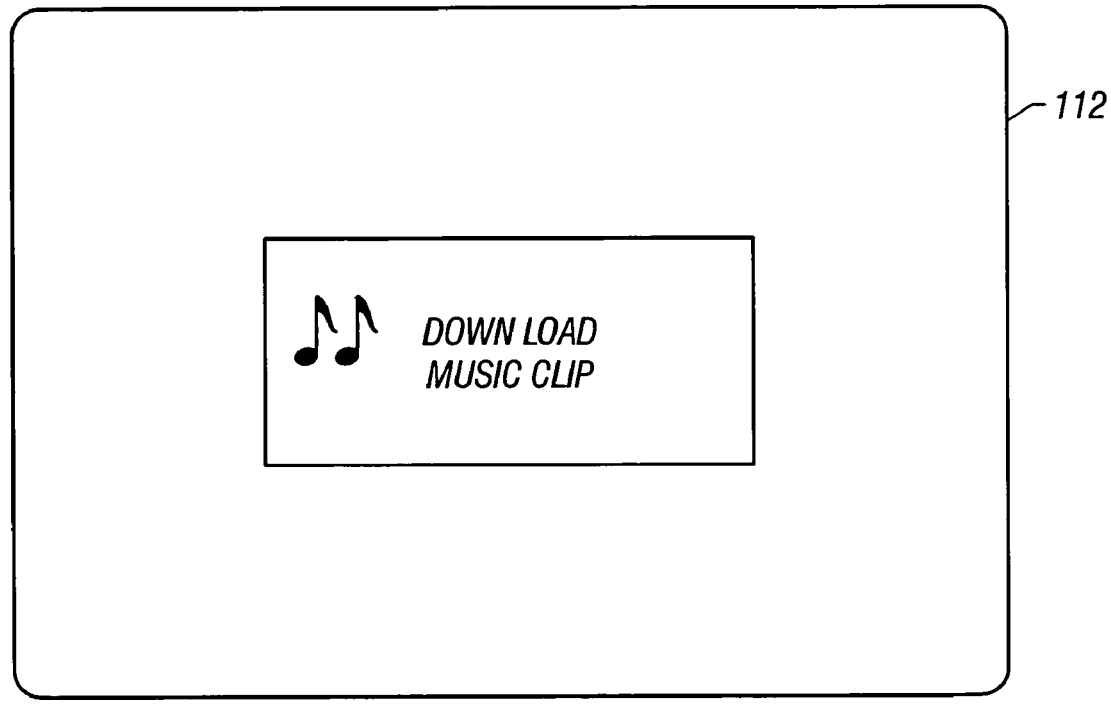
FIG. 8 is a screen shot illustrating the downloading of an audio file in accordance with one embodiment of the present invention.

Once the CD jewel case is open, one exemplary scenario for allowing the user to purchase the CD, purchase individual songs or view lyrics is as follows. Specifically, cover art and a song list 332 are preferably displayed on the left side 330 of the jewel case. On the right side 334 of the jewel case a CD 336 is preferably displayed with a song list 338 thereon. Another song list 340 is displayed just to the side of the CD 336. An "add to shopping cart" button 342 is preferably displayed below the jewel case. If the user clicks on any of the songs in the song list 332, the song lyrics are displayed, preferably over the cover art as illustrated in FIG. 7. If the user clicks on any of the songs in the song list 338, a sound clip is played. If the user clicks on any of the songs in the song list 340, the electronic distribution of that song is triggered along with an e-commerce instant transaction. The song is downloaded as illustrated in FIG. 8. Finally, if the user clicks on the "add to shopping cart" button 342, the process of delivering a hard copy of the CD to the user begins.

With respect to the above example, it should be understood that as the user interacts with the display on the screen 112, steps 218 through 238 of the process 200 are repeated in order to send modified display data from the server 104 to the client computer 108 in order to update the display on the screen 112.

Through the use of graphical representations and animation of CD music information including jewel case cover art, song titles, lyrics and music clips, customers can select products in which they are interested. This will simulate the buying process customers would experience in a regular brick and mortar music store. While the example of a virtual music store has been presented here, it should be well understood that the present invention may be applied to many other types of products and e-commerce, including but not limited to, types of e-commerce involving digital information downloads, banking and financial transactions, and many other areas.

Figure 9:
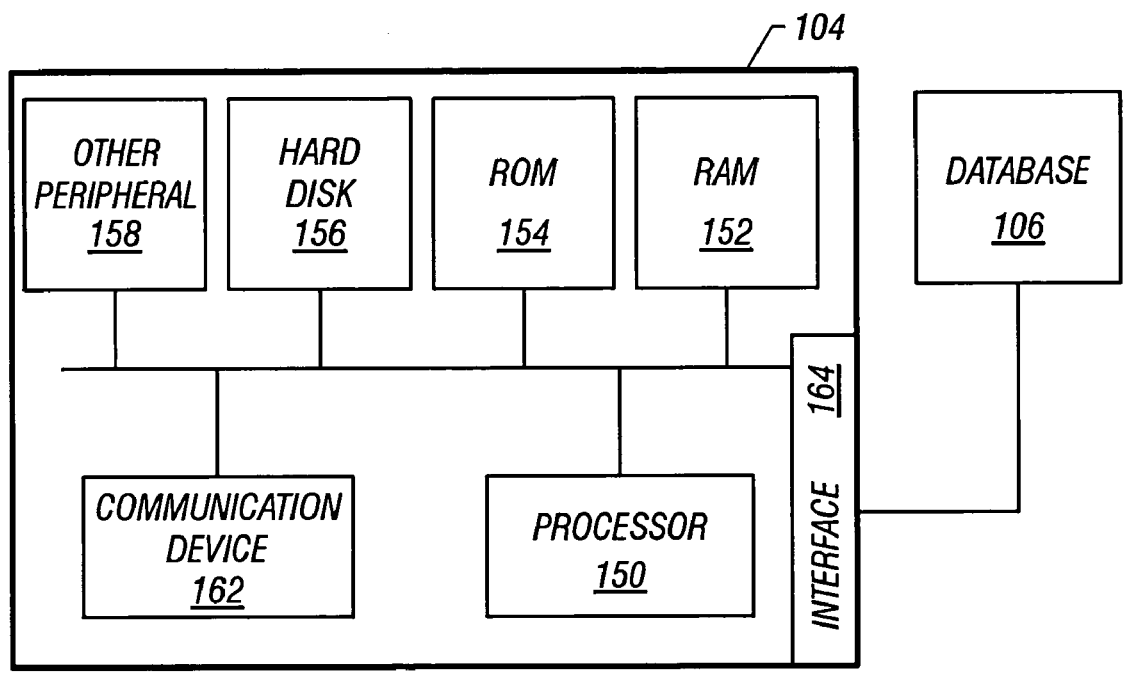
FIG. 9 is a block diagram illustrating an exemplary architecture for the server shown in FIG. 1.

Referring to FIG. 9, there is illustrated an exemplary architecture for the server 104. The server 104 may include a processor 150, a random access memory (RAM) 152, a read only memory (ROM) 154, hard disk storage 156, other peripherals 158, and an interface 164, all interconnected by a main bus 160. Furthermore, a communication device 162 is preferably included that is configured to provide a connection to a computer network, such as the network 102. The communication device 162 may comprise a modem or other means for connecting to a network. The processor 150 may comprise a microprocessor or the like. The processor 150 and the appropriate memories are preferably configured to perform the methods described herein. Such configuring is typically done by means of software. Furthermore, it should be understood that the various databases described herein for storing personalization data, user information, graphics and animation, CD cover art, audio files, etc., may be stored in the database 106, or the hard disk storage 156, or some other storage device.

The full disclosures and entire contents of U.S. Pat. Nos. 5,848,399, 5,963,916, and 5,237,157 are hereby expressly incorporated by reference into the present application as if fully set forth herein.

While the invention herein disclosed has been described by the specific embodiments and applications thereof, numerous modifications and variations could be made thereto by those skilled in the art without departing from the scope of the invention set forth in the claims.

What is claimed is:

1. A method of providing a product presentation to a user, comprising the steps of:
   retrieving personalization data for a particular user from a database;
   assembling display data that is configured to render a three-dimensional display area on a video display, the display area including images of one or more products that are selected based on the personalization data;
   sending the display data through a computer network for display on a client computer video display;
   receiving a communication from the client computer through the computer network, the communication resulting from interactions with the display area; and
   updating the personalization data for the particular user in the database based on the communication.

2. A method in accordance with claim 1, wherein the communication comprises an instruction to select one of the product images in the display area.

3. A method in accordance with claim 1, wherein the communication comprises an instruction to manipulate one of the product images in the display area.

4. A method in accordance with claim 1, further comprising the step of:
   assembling modified display data that is configured to render a modified display area having at least a portion of a selected one of the product images shown in more detail.

5. A method in accordance with claim 4, further comprising the step of:
   sending the modified display data through the computer network for display on the client computer video display.

6. A method in accordance with claim 1, wherein the step of updating the personalization data comprises the step of:
   processing data included in the communication with a personalization engine.

7. A method in accordance with claim 1, wherein the communication comprises a request for an audio file.

8. A method in accordance with claim 1, further comprising the step of:
   sending an audio file through the computer network to the client computer.

9. A method in accordance with claim 1, wherein the communication comprises one or more search terms.

10. A method in accordance with claim 1, wherein the display area comprises an input box configured to receive search terms.

11. A method in accordance with claim 1, wherein the display area comprises a virtual room.

12. A system for providing a product presentation to a user, comprising:
    a database configured to store personalization data for a particular user;
    a communication device configured to provide a connection to a computer network; and
    a processing system configured to retrieve the personalization data from the database, assemble display data that is configured to render a three-dimensional display area on a video display with the display area including images of one or more products that are selected based on the personalization data, send the display data through the computer network for display on a client computer video display, receive a communication from the client computer through the computer network with the communication resulting from interactions with the display area, and update the personalization data for the particular user in the database based on the communication.

13. A system in accordance with claim 12, wherein the communication comprises an instruction to select one of the product images in the display area.

14. A system in accordance with claim 12, wherein the communication comprises an instruction to manipulate one of the product images in the display area.

15. A system in accordance with claim 12, wherein the processing system is further configured to assemble modified display data that is configured to render a modified display area having at least a portion of a selected one of the product images shown in more detail.

16. A system in accordance with claim 15, wherein the processing system is further configured to send the modified display data through the computer network for display on the client computer video display.

17. A system in accordance with claim 12, wherein the processing system is further configured to update the personalization data by processing data included in the communication with a personalization engine.

18. A system in accordance with claim 12, wherein the communication comprises a request for an audio file.

19. A system in accordance with claim 12, wherein the processing system is further configured to send an audio file through the computer network to the client computer.

20. A system in accordance with claim 12, wherein the communication comprises one or more search terms.

21. A system in accordance with claim 12, wherein the display area comprises an input box configured to receive search terms.

22. A system in accordance with claim 12, wherein the display area comprises a virtual room.

* * * * *